Oct. 4, 1966 TADAHIRO SEKIMOTO 3,277,462

PARALLEL-PARALLEL ENCODING SYSTEM

Filed Jan. 22, 1964 3 Sheets-Sheet 1

Inventor
T. SEKIMOTO
By R. Morris
Attorney

Oct. 4, 1966 TADAHIRO SEKIMOTO 3,277,462

PARALLEL-PARALLEL ENCODING SYSTEM

Filed Jan. 22, 1964 3 Sheets-Sheet 2

Inventor
T. SEKIMOTO
By [signature]
Attorney

Inventor
T. SEKIMOTO
By R. P. Morris
Attorney

United States Patent Office 3,277,462

Patented Oct. 4, 1966

3,277,462

PARALLEL-PARALLEL ENCODING SYSTEM

Tadahiro Sekimoto, Minato-ku, Tokyo, Japan, assignor to Nippon Electric Company, Limited, Tokyo, Japan, a corporation of Japan Filed Jan. 22, 1964, Ser. No. 339,491
Claims priority, application Japan, Feb. 7, 1963, 38/6,424
8 Claims. (Cl. 340—347)

Figures 1, 2, 4:
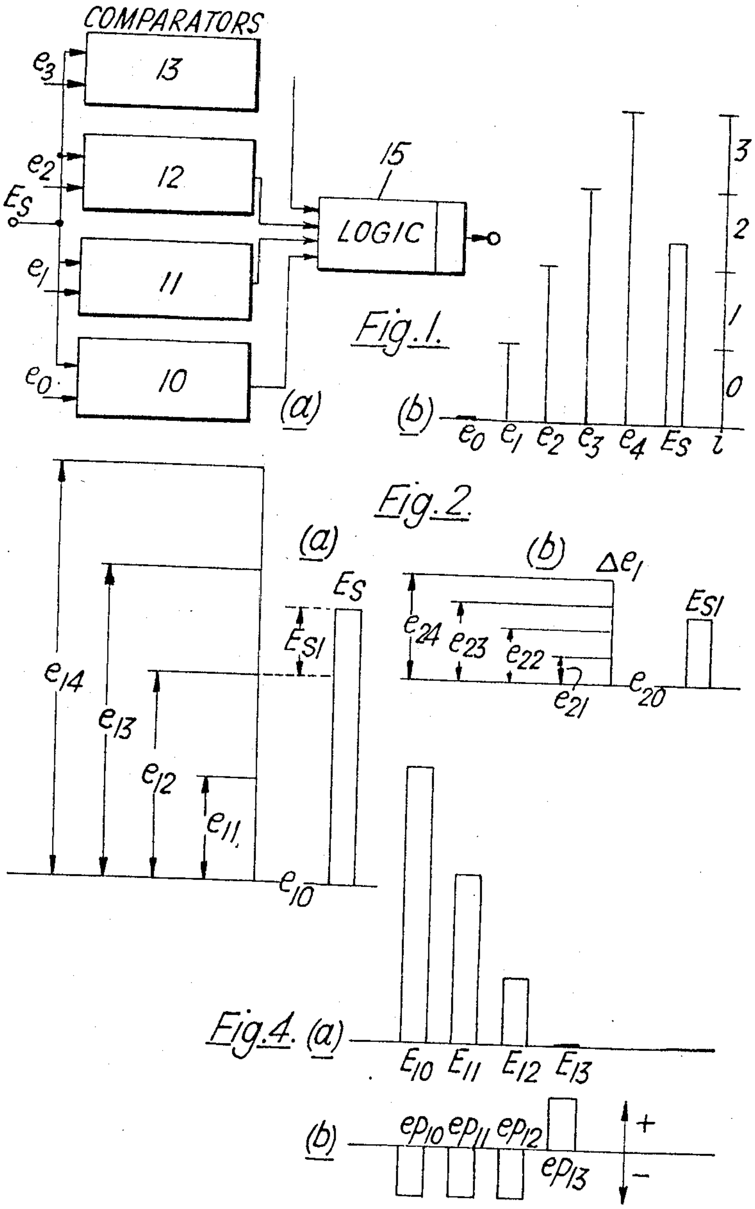

The present invention relates in general to an encoding system for use in P.C.M. telecommunication, and more particularly to a cascaded parallel encoding system, which has a simpler construction but nevertheless retains the high speed encoding characteristics inherent to a parallel encoding system.

The pulse code modulation (P.C.M.) system is one which is noted as being relatively noise-proof and produces low crosstalk. Various embodiments of such a system exist such as, for example, a counter type, a comparator type, a multi-frequency type, a coding tube type, etc. P.C.M. systems are used in the following: a millimeter wave communication, light wave communication and the like which have a voice signal, video signal, etc. as their object. In the application to such wide-band transmission since the repetition frequency of the so-called transmission pulses becomes fairly high, the so-called high speed P.C.M. encoder is required. In general, when a high speed performance of the circuit forming the P.C.M. system is required, it is more advantageous to employ a parallel encoding system.

Prior art parallel encoding systems require a number of reference voltages (one for each quantized level to be used in encoding) the same number of comparators (for comparing a sampled level value with said reference voltages), and logic circuits, one for each of said quantized levels for converting an output pattern of said comparators (consisting of either 1 or 0) into a binary code. Therefore, as the number of quantized levels increase (for example, for 7 bit binary encoding, 128 quantized levels will be needed), the encoding system becomes more complex and consequently the encoding apparatus becomes more expensive. From these reasons, serial encoding systems (which are inferior to parallel encoding system in high speed characteristics), have usually been employed.

Therefore, a principal object of the present invention is to provide a novel encoding system which reduces the complexity of the parallel encoding system in the prior art to lower the cost of the encoding apparatus while retaining the high speed characteristics inherent to the parallel encoding system and thus facilitates encoding for any large number of quantized levels.

Another object of the present invention is to provide the above-described novel encoding system, which enables encoding into any arbitrary $n$-digit $m$-ary code ($n$, $m$ are any arbitrary positive integers).

One feature of the present invention is the provision of a parallel-parallel encoding system for converting an input analogue signal into a digital code. In this parallel-parallel system, a sampled level value of said input analogue signal is encoded in parallel with respect to a plurality of first reference level values having relatively coarse intervals, and also among the difference values between said sampled level values and the respective ones of said plurality of first reference levels, the one having a predetermined sign (either positive or negative) and the least magnitude is further encoded in parallel with respect to a plurality of second reference values having relatively fine intervals. These encoding operations, if necessary, are repeated until the parallel encoding has been carried out to any desired degree of fine intervals, whereby the digital code corresponding to said input analogue signal may be obtained as a result of these plural times of parallel encoding.

Another feature of the present invention is the provision in the above-featured parallel-parallel encoding system that the code (for each one of the parallel encodings) be given as an $m$-ary code, to obtain as a result of the plural encodings an $n$-digit $m$-ary code corresponding to said input analogue signal (where $m$ and $n$ are any arbitrary positive integers).

Figure 3:
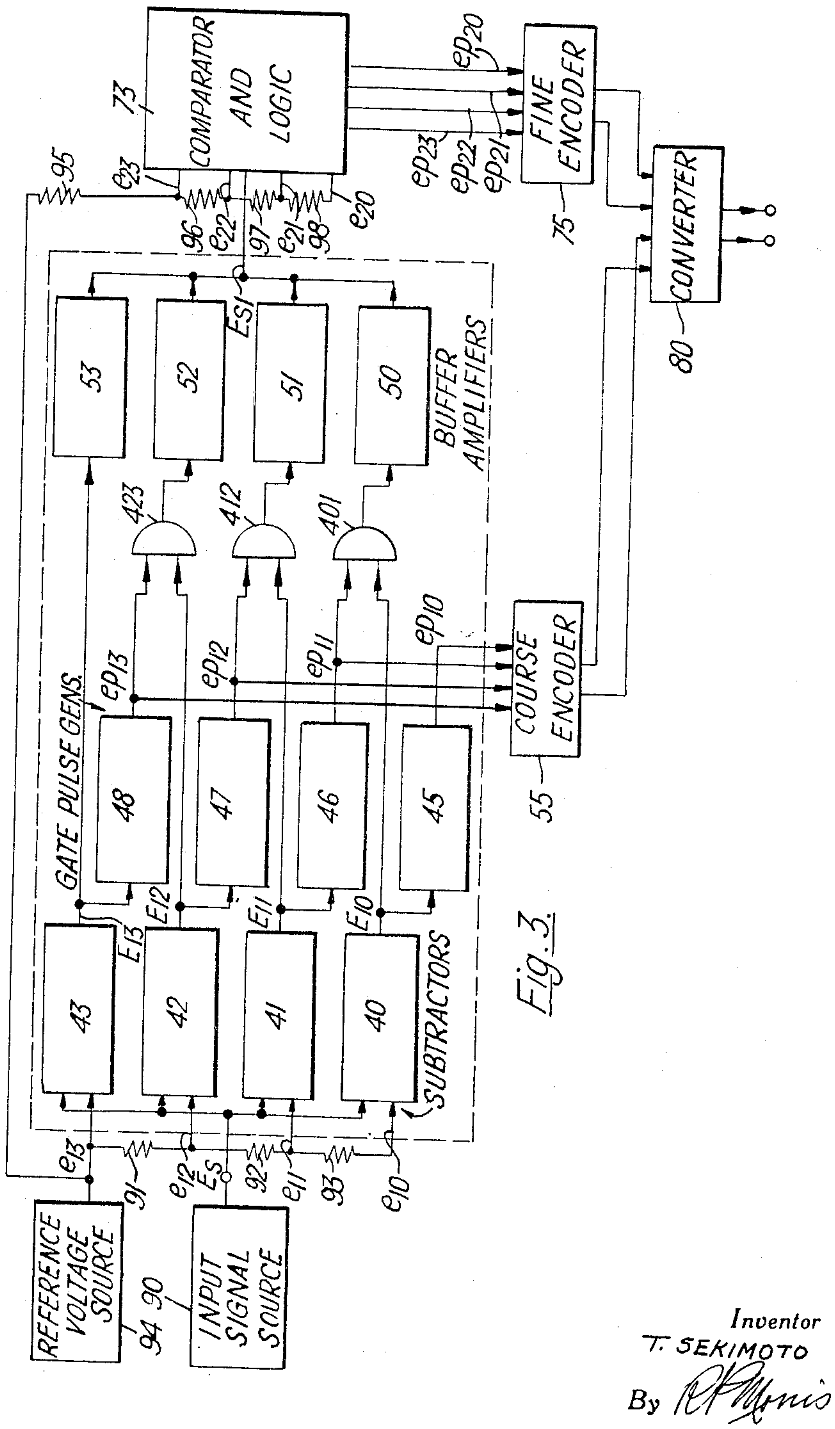
Figure 5:
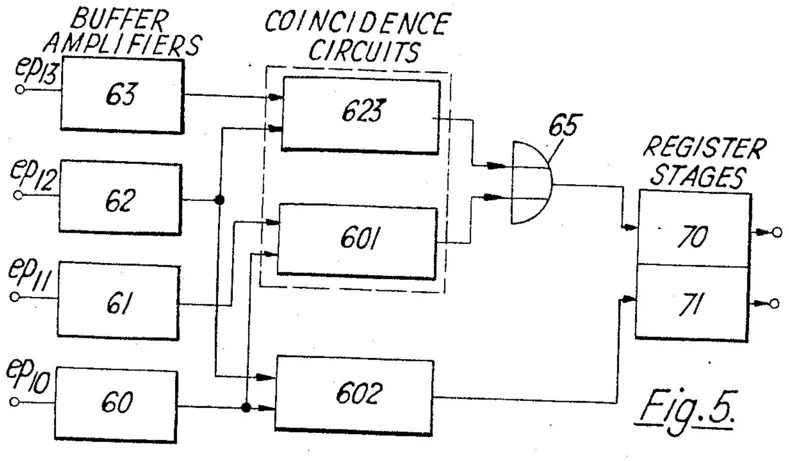
Figure 6:
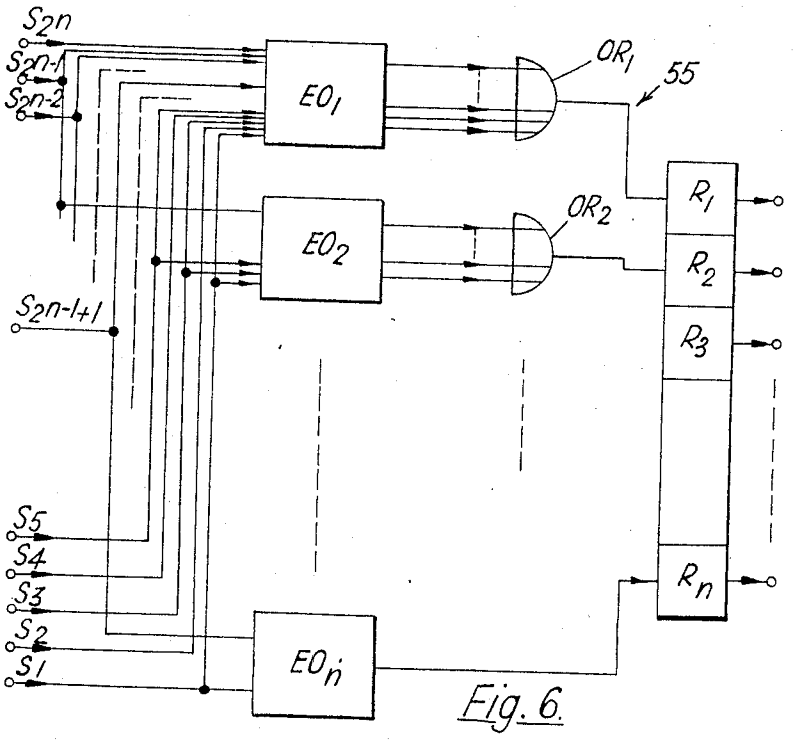

The above mentioned and other features and objects of this invention and the means of attaining them will become more apparent and the invention itself will be best understood by reference to the following description of embodiments of the invention taken in conjunction with the accompanying drawings in which:

FIGS. 1($a$) and 1($b$) illustrate the principle of parallel encoding as known in the prior art;

FIGS. 2($a$) and 2($b$) illustrate the principle of parallel-parallel encoding according to the present invention;

FIG. 3 is a block diagram showing one embodiment of the parallel-parallel encoding system according to the present invention;

FIGS. 4($a$) and 4($b$) are of waveforms appearing in the block diagram of FIG. 3;

FIG. 5 is a more detailed block diagram of a logic circuit portion for parallel encoding, which is used in the block diagram of FIG. 3; and FIG. 6 is a block diagram of a logic circuit corresponding to that shown in FIG. 5, which is generalized for the cases of $n$-digit binary encoding.

Now, before describing the present invention, a prior art parallel encoding system will be described with reference to the block diagram of FIG. 1($a$). This figure shows a parallel encoding system in which the member of quantized levels was assumed to be 4. This system performs encoding by comparing a sample level value $E_s$ with reference voltages $e1$, $e2$, $e3$ and $e4$ in comparators 10, 11, 12 and 13. As shown in FIG. 1($b$), $e4$ is the upper limit of the sampled level values. The comparator outputs are either 1 or 0 depending upon whether the sign of the difference between $E_s$ minus $e_i$ ($i$ is 0, 1, 2, or 3) is positive or negative. These outputs are converted in a logic circuit 15 into an $m$-ary code (usually a binary code) corresponding to the order number of the quantized level (in the example illustrated in FIG. 1($b$), quantized level No. 2) on which the sampled level value $E_s$ exists. More particularly, in the case where $E_s$ is larger than $e_i$ and not larger than $e_{i+1}$, a quantized level number $i$ as indicated on the scale designated as $i$ at the right-hand side (the ordinate axis) of FIG. 1($b$), is determined and thus the corresponding $m$-ary code is obtained. According to this system, a higher speed encoding operation may be expected in comparison with a serial encoding system based on a quantizing and feed-back principle, because the quantized level number $i$ corresponding to the sampled level value $E_s$ is instantaneously given from the output pattern of the comparators 10 to 13 arranged in parallel which consists of binary 1 and 0, and thereafter the number is subjected to a logical calculation in the logic circuit 15 so as to be encoded.

The operation principle of the parallel-parallel encoding system according to the present invention, will be described with reference to FIGS. 2($a$) and 2($b$) of the drawings. In the parallel-parallel encoding system according to the present invention, the entire range of amplitude levels are separated by a plurality of first quantized levels at equal intervals which are obtained by equally dividing the maximum amplitude level of an input signal into $n_1$ parts. (In FIG. 2($a$), $n_1=4$). The reference voltages $e_{11}$, $e_{12}$, . . . $e_{1n}$ of FIG. 2($a$) respectively corresponding with the quantized levels being determined with respect to the minimum amplitude level $e_{10}$. Thus the sampled level value E$s$ is at first encoded in accordance with the parallel encoding system as described previously in FIG. 1($a$). Simultaneously the differences of E$s$ minus $e_{1_j}$ ($j$ is 0, 1 . . ., $n_1-1$) which results in the least positive value remainder E$s_1$ is obtained (in the example of FIG. 2, the difference of E$s$ minus $e_{12}$). Thereafter, the range $$\Delta e_1 = e_{1(j+1)} - e_{1j} \ (j=0, 1, \ldots, n_1-1)$$

is separated into a plurality of second quantized levels of equal intervals by equally dividing the range $\Delta e_1$ into $n_2$ parts. (FIG. 2($b$) shows $n_2=4$ for example.) The reference voltages $e_{21}, e_{22} \ldots, e_{2n_2}$ of FIG. 2($b$) respectively correspond to these quantized levels being determined with respect to the level $e_{20}$. Thus the value $E_{s1}$ is further encoded by the parallel encoding system. If still finer quantization is required, it is only necessary to seek for the least positive value for the differences of $E_{s1}$ minus $e_{2k}$ ($k$ is 0, 1, . . . , $n_2-1$) and then repeat the parallel encoding in the manner as described above. While $e_{10}$ and $e_{20}$ may have any value, in the following description both $e_{10}$ and $e_{20}$ are assumed to be zero.

Furthermore, in the above quantizing system, a method was employed in which when E$s$ is larger than $e_{1_j}$ and not larger than $e_{1(j+1)}$, (quantized level number $j$ is given to the sampled level value E$s$), and for that purpose the minimum positive value among the differences of E$s$ minus $e_{1_j}$ was required. However, the system can operate equally as well if $e_{11}$, $e_{12}$, $e_{13}$, and $e_{14}$ in FIG. 2($a$) are employed as the plurality of first reference levels, and if a negative value having the minimum absolute value among the differences of E$s$ minus $e_{1(j+1)}$ is utilized to give the quantized level number $j$. The present invention may employ either of these methods, and it is quite apparent to those skilled in the art that an encoded apparatus corresponding to the latter method may be obtained by slightly modifying an encoding apparatus corresponding to the former method. Therefore, in the following description, the present invention will be described in accordance with the former method without losing any generality. It is also true for the method of selecting the plurality of second reference levels ($e_{20}$, $e_{21}$, $e_{22}$, $e_{23}$, and $e_{24}$).

Summarizing the above-described principle of operation, in the parallel-parallel encoding system according to the present invention, a sampled level value of an input analogue signal is encoded in parallel with respect to a plurality of first reference level values having relatively coarse intervals. The sampled level value is also utilized to obtain the difference between said sampled level values and one of the first reference levels. The difference is selected to have a predetermined sign (either positive or negative) and the least magnitude. The difference value is further encoded in parallel with respect to a plurality of second reference values having relatively fine intervals. These encoding operations are, if necessary, repeated until the parallel encoding has been carried to reference level values having a desired degree of fine intervals, whereby the digital code corresponding to said input analogue signal may be obtained as a result of these plural parallel encodings.

In the above-described example, the first parallel encoding with coarse intervals has been carried out with respect to four quantized levels; the result is expressed by a 2-digit binary code. The second parallel encoding also with four intervals is then carried out. The result is also expressed by a 2-digit binary code, and accordingly if these results are combined, the original input analogue signal will become to be converted into a 4-digit binary code.

The encoding apparatus embodying the parallel-parallel encoding system of the present invention, will be explained with reference to the block diagram in FIG. 3.

In the following example, is illustrated for the particular case where $n_1=4$ and $n_2=4$. However, it could be understood that $n_1$ and $n_2$ can be any number and that the number of steps of the cascaded parallel system (parallel-parallel system) is not limited to 2, but in general it may be practiced as N steps. Furthermore, although the operation of the circuit is described in connection with the case where the input sampled level value E$s$ is as shown in FIG. 2($a$), this assumption is made for purposes of illustration; it should be understood that E$s$ may have any value.

As shown in FIG. 3, the input sampled level value E$s$ from source 90 is simultaneously applied to (subtracters) 40, 41, 42, and 43, and the differences between the reference voltages $e_{10}$ (=0), $e_{11}$, $e_{12}$, and $e_{13}$, are obtained respectively therein. The values of the reference voltages $e_{11}$, $e_{12}$, and $e_{13}$ are predetermined by equally dividing the maximum amplitude level $e_{14}$ into four parts as shown in FIG. 2($a$). Thus for example, in FIG. 3 if the reference voltage source 94 provides a voltage equal to $e_{14}$ then voltage dropping means known per se such as impedances 91, 92, 93 may be provided to drop the voltage of said source to provide reference voltages $e_{12}$, $e_{11}$, and $e_{10}$. If a rectifier element (not shown) such as a semiconductor diode is provided at an output of each of the subtracters 40 to 43 so that the subtracter may produce an output value only when it is positive (and does not produce an output when it is negative), outputs E10, E11, E12 from the comparators (subtracters) 40, 41, 42, and 43 respectively will provide waveforms as shown in FIG. 4($a$) (assuming the input sampled level value E$s$ is as shown in FIG. 2($a$)). These outputs are respectively supplied to gating pulse generators 45, 46, 47, and 48. When the output value of the substracters (provided with a rectifier element as described) is zero, the corresponding gating pulse generator generates a positive pulse as shown at $e_{p13}$ in FIG. 4($b$). When the output of the subtracter takes a finite positive value, the corresponding gating pulse generator generates a negative pulse as shown at $e_{p10}$, $e_{p11}$, $e_{p12}$, and $e_{p13}$ which are applied respectively as one control input to gates 401, 412, and 423. The other input to these gates 401, 412, and 423 are respectively the outputs of the subtracters 40, 41, 42 (i.e. $E_{10}$, $E_{11}$, $E_{12}$) corresponding to the next lower quantized levels, except for the gating pulse $e_{p10}$ which corresponds to the lowest quantized level. Outputs of these gates 401, 412, and 423 are connected to buffer amplifiers 50, 51, and 52 respectively. In addition, an output circuit of the subtracter 43 corresponding to the highest quantized level is directly connected to a buffer amplifier 53 without passing through a gate. The gates 401, 412, and 423 are adapted to open when the respective control inputs $e_{p11}$, $e_{p12}$, and $e_{p13}$ are positive and to close when they are negative. If the input sampled level value E$s$ is at the assumed signal level shown in FIG. 2($a$), $e_{p10}$, $e_{p11}$, $e_{p12}$, and $e_{p13}$ take the pattern as shown in FIG. 4($b$), then only gate 423 opens and gates 401 and 412 are closed. Since the output $E_{13}$ from the subtracters (corresponding to the highest quantized level) is zero as shown in FIG. 4($a$), the buffer amplifier 53 which is directly supplied with said output $E_{13}$, has no input, while the buffer amplifiers 50 and 51 also have no input because of the gates 401 and 412 are closed. Consequently, only the buffer amplifier 52 is supplied at its input with the output $E_{12}$ of the subtracter 42, which is applied through the gate 423 which is opened by the positive pulse $e_{p13}$. Therefore, if the outputs of the buffer amplifiers 50, 51, 52, and 53 are combined, the least positive value $E_{s1}$ (in this example, $E_{12}$) among the differences between the input sampled level values E$s$ and the reference levels $e_{10}$, $e_{11}$, $e_{12}$ and $e_{13}$ respectively, is obtained as an "OR" output from these buffer amplifiers. On the other hand, if the gating pulses $e_{p10}$, $e_{p11}$, $e_{p12}$, and $e_{p13}$, which are the outputs from the gating pulse generators 45 to 48 respectively, are supplied to a logic circuit 55 to carry out parallel encoding, the first encoding with respect to the reference levels at coarse intervals, may be completed.

One embodiment of the logic circuit 55 for carrying out parallel encoding, is shown in FIG. 5. In connection with the gating pulse waveforms $e_{p10}$, $e_{p11}$, $e_{p12}$, and $e_{p13}$, the waveform will be abbreviated as "1" when it is a positive pulse, and as "0" when it is a negative pulse (in the example illustrated in FIG. 4(*b*), $e_{p10}$, $e_{p11}$, and $e_{p13}$ are "0" and $e_{p13}$ is "1"). As shown in FIG. 5, the gating pulses are, after passing through known buffer amplifiers 60, 61, 62, and 63, led to known incoincident circuits 601, 602, and 623 which are connected to the outputs of the buffer amplifiers 60 to 63. The coupling relation between the buffer amplifiers 60 to 63 and the incoincident circuits 601, 602, and 623 as shown in FIG. 5, are such that incoincidence between the outputs of the adjacent buffer amplifier pair including the lowest number amplifier 60 (60 and 61), the next succeeding adjacent buffer amplifier pair (62 and 63), and the alternate buffer amplifier pair including the lowest number amplifier 60 (60 and 62) may be detected. Then an "OR GATE" circuit 65 is connected to the outputs of the incoincident circuits 601 and 623. By means of the above-described connection, the states of registers 70 and 71 are determined as a function of the states of $e_{p10}$, $e_{p11}$, $e_{p12}$, and $e_{p13}$ as shown in Table 1. Thus 2-digit binary encoding in response to the magnitude of the input sampled level E*s* has been carried out.

*Table 2*

| | | | | | | | | | | | | | | | | |
|---|---|---|---|---|---|---|---|---|---|---|---|---|---|---|---|---|
| $S_{16}$ | 0 | 1 | 1 | 1 | 1 | 1 | 1 | 1 | 1 | 1 | 1 | 1 | 1 | 1 | 1 | 1 |
| $S_{15}$ | 0 | 0 | 1 | 1 | 1 | 1 | 1 | 1 | 1 | 1 | 1 | 1 | 1 | 1 | 1 | 1 |
| $S_{14}$ | 0 | 0 | 0 | 1 | 1 | 1 | 1 | 1 | 1 | 1 | 1 | 1 | 1 | 1 | 1 | 1 |
| $S_{13}$ | 0 | 0 | 0 | 0 | 1 | 1 | 1 | 1 | 1 | 1 | 1 | 1 | 1 | 1 | 1 | 1 |
| $S_{12}$ | 0 | 0 | 0 | 0 | 0 | 1 | 1 | 1 | 1 | 1 | 1 | 1 | 1 | 1 | 1 | 1 |
| $S_{11}$ | 0 | 0 | 0 | 0 | 0 | 0 | 1 | 1 | 1 | 1 | 1 | 1 | 1 | 1 | 1 | 1 |
| $S_{10}$ | 0 | 0 | 0 | 0 | 0 | 0 | 0 | 1 | 1 | 1 | 1 | 1 | 1 | 1 | 1 | 1 |
| $S_9$ | 0 | 0 | 0 | 0 | 0 | 0 | 0 | 0 | 1 | 1 | 1 | 1 | 1 | 1 | 1 | 1 |
| $S_8$ | 0 | 0 | 0 | 0 | 0 | 0 | 0 | 0 | 0 | 1 | 1 | 1 | 1 | 1 | 1 | 1 |
| $S_7$ | 0 | 0 | 0 | 0 | 0 | 0 | 0 | 0 | 0 | 0 | 1 | 1 | 1 | 1 | 1 | 1 |
| $S_6$ | 0 | 0 | 0 | 0 | 0 | 0 | 0 | 0 | 0 | 0 | 0 | 1 | 1 | 1 | 1 | 1 |
| $S_5$ | 0 | 0 | 0 | 0 | 0 | 0 | 0 | 0 | 0 | 0 | 0 | 0 | 1 | 1 | 1 | 1 |
| $S_4$ | 0 | 0 | 0 | 0 | 0 | 0 | 0 | 0 | 0 | 0 | 0 | 0 | 0 | 1 | 1 | 1 |
| $S_3$ | 0 | 0 | 0 | 0 | 0 | 0 | 0 | 0 | 0 | 0 | 0 | 0 | 0 | 0 | 1 | 1 |
| $S_2$ | 0 | 0 | 0 | 0 | 0 | 0 | 0 | 0 | 0 | 0 | 0 | 0 | 0 | 0 | 0 | 1 |
| $S_1$ | 0 | 0 | 0 | 0 | 0 | 0 | 0 | 0 | 0 | 0 | 0 | 0 | 0 | 0 | 0 | 0 |
| $R_4$ | 0 | 0 | 0 | 0 | 0 | 0 | 0 | 0 | 1 | 1 | 1 | 1 | 1 | 1 | 1 | 1 |
| $R_3$ | 0 | 0 | 0 | 0 | 1 | 1 | 1 | 1 | 0 | 0 | 0 | 0 | 1 | 1 | 1 | 1 |
| $R_2$ | 0 | 0 | 1 | 1 | 0 | 0 | 1 | 1 | 0 | 0 | 1 | 1 | 0 | 0 | 1 | 1 |
| $R_1$ | 0 | 1 | 0 | 1 | 0 | 1 | 0 | 1 | 0 | 1 | 0 | 1 | 0 | 1 | 0 | 1 |

The encoding outputs from the parallel encoding logic circuit 55 in FIG. 3 correspond, for example, to the outputs from the registers 70 and 71 in FIG. 5. The process for carrying out encoding with respect to finer reference levels, may be achieved by means of a circuit similar to that required for carrying out coarse parallel encoding from the input sampled level value E*s*. In this case, in order to carry out further encoding with respect to still further fine reference levels, exactly the same circuit construction is required. The finer reference signals $e_{20}$, $e_{21}$, $e_{22}$, and $e_{23}$ may be generated for example, by utilization of the use of series impedances 95, 96, 97 and 98 connected to reference signal source 94. However, if the additional fine encoding is unnecessary, (that is, if it is only required to encode the minimum positive one $E_{s1}$ among the outputs from the comparators (subtracters) 40 to 43 as illustrated in FIG. 3), then the block 73 of FIG. 3 includes a circuit similar to the subtracters 40, 41, 42, and 43 and a circuit corresponding to the gating pulse generators 45, 46, 47, and 48 in the same coupling relation. (Alternatively, block 73 may be a simple comparator for determining which one of its two inputs is larger than the other.) When the finer reference levels $e_{20}$, $e_{21}$, $e_{22}$, and $e_{23}$ are as shown in FIG. 2(*b*), pulses $e_{p20}$, $e_{p21}$, $e_{p22}$, and $e_{p23}$ corresponding to the gating pulses are furnished from the block 73 in FIG. 3 to a parallel encoding logic circuit 75 which is exactly the same as the parallel encoding logic circuit 55, and converted into a binary code therein.

*Table 1*

| $e_{p10}$ | $e_{p11}$ | $e_{p12}$ | $e_{p13}$ | 601 Output | 623 Output | 65 70 Output state | 602 71 Output state | Corresponding binary code |
|---|---|---|---|---|---|---|---|---|
| 0 | 0 | 0 | 0 | 0 | 0 | 0 | 0 | 00 |
| 0 | 0 | 0 | 1 | 0 | 1 | 1 | 0 | 10 |
| 0 | 0 | 1 | 1 | 0 | 0 | 0 | 1 | 01 |
| 0 | 1 | 1 | 1 | 1 | 0 | 1 | 1 | 11 |

The above-mentioned parallel encoding system is not limited to the case of 2-digit binary encoding, but in general is applicable to the cases of *n*-digit binary coding. The general case is shown in FIG. 6. Referring to FIG. 6, there exists $2^n$ kinds of gating pulses, which are indicated as $S_1$, $S_2$, . . . , $S_{2^n}$ in sequence which are obtained by comparison with the minimum reference voltage. Then, if incoincidence exists between S1 and S2, S3 and S4, . . . , or $S_{2^n-1}$ and $S_{2n}$, a code "1" is stored in a register R1 by means of incoincident circuit group $EO_1$ and an "OR GATE" circuit $OR_1$. If a zero (i.e. a not state) exists, a code "0" is stored, and simultaneously the existence of coincidence between alternatively taken pulses $S_1$ and $S_3$, $S_5$ and $S_7$, . . . , or $S_{2^n-3}$ and $S_{2^n-1}$ is stored in a register $R_2$ by means of incoincident circuit group $EO_2$ and an "OR GATE" circuit $OR_2$. In a similar manner, with regard to the pulse series including $S_1$ taken from the original series $S_1$, $S_2$, . . . , $S_{2^n}$ so as to have 3, 7, . . . , $2^n-1$ intervening pulses respectively, the outputs of the corresponding incoincident circuit groups and "OR GATE" circuits are stored in registers R3, . . . , and R*n* respectively. The pulse series having $2^{n-1}-1$ intervening pulses and including $S_1$, consists of only $S_1$ and $S_{2^{n-1}+1}$, and therefore, for this pulse series the incoincident circuit group EO*n* may comprise only one incoincident circuit, and the output of this incoincident circuit may be directly connected to the register R*n* without the need for an "OR GATE" circuit. Table 2 shows the states of $R_1$, $R_2$, . . . , and R*n* for the various states of $S_1$, $S_2$, . . . , and $S_{16}$ in the case of $n=4$, and also shows the results of encoding in the case of quantizing into 16 levels.

The encoding outputs from the parallel encoding logic circuits 55 and 75 may be either transmitted in parallel without modification or once converted into a serial code in a parallel-series converter circuit 80 as shown in FIG. 3 and then transmitted.

As explained with reference to the above embodiments, the novel system provides for first encoding in parallel the input sampled level value E*s* with respect to coarse reference levels and then further encoding in parallel the minimum positive value $E_{s1}$ among the differences between the input sampled level value E*s* and said reference levels with respect to fine reference levels. This system greatly reduces the inherent complexity of circuitry needed to perform parallel encoding in the prior art, and also provides high speed encoding. For instance, a comparison of the circuit construction for 4-digit binary encoding by means of two stages of parallel-parallel encoding with that for the same encoding by means of a simple parallel encoding system, is shown in Table 3.

*Table 3*

| | Parallel-parallel | Parallel |
|---|---|---|
| Number of Subtracters | 4 | 0 |
| Number of Comparators | [1] 4 | 16 |
| Number of Gating Pulse Generators | [2] 4 | 0 |
| Number of Gates | 3 | 0 |
| Number of Incoincident Circuits | 3+3=6 | 15 |
| Number of OR Circuits | 1+1=2 | 4 |
| Number of Registers | 2+2=4 | 4 |

[1] In the second stage, instead of subtracters, comparators may be used.
[2] In the second stage, gating pulse generators are unnecessary, because comparators are used instead of the subtracters.

Furthermore, if the number of code digits is increased to eight digits, in the case of prior art parallel encoding, the number of comparators will essentially become $$256-1=255$$

and the number of incoincident circuits will also become $$2^7+2^6+2^5+2^4+2^3+2^2+2^1+1=2^8-1=255$$

and therefore the encoding apparatus will become quite complex. However, in the case of parallel-parallel encoding consisting of four stages of 2-digit encoding, the number of subtracters is 4×3, or 12, the number of comparators is 4, the number of gating pulse generators is 4×3, or 12, and the number of gates is 3×4, or 12. Thus the total number of circuit component is 40. In addition, the number of incoincident circuits is 6×2, that is 12. These compared values clearly indicate that parallel-parallel encoding is simpler in construction than prior art parallel encoding.

Now, if the above-mentioned encoding of quantized level numbers in the respective stages of parallel-parallel encoding by means of, for instance, the logic circuits 55 and 75, is carried out in general into an $n_1$-digit $m$-ary code, $n_2$-digit $m$-ary code, . . . , $n_k$-digit $m$-ary code respectively, an $n$-digit $m$-ary code may be easily obtained by combining these encoding outputs in the circuit 80, where $n$ is represented by $$n_1+n_2+. . .+n_k=n$$

It is also possible to carry out different types of encoding such as $m_1$-ary, $m_2$-ary, . . . , $m_k$-ary encoding in the respective stages, and to combine these results in the circuit 80.

While I have described above the principles of my invention in connection with specific embodiments, it is to be clearly understood that this description is made only by way of example and not as a limitation to the scope of my invention as set forth in the objects thereof and in the accompanying claims.

What is claimed is:

1. A parallel-parallel encoding system for converting analogue input signals into coded digital output signals comprising:

(a) an input signal source;

(b) means for generating a group of relatively coarse reference signals and at least one group of relatively fine reference signals;

(c) a first group of parallel connected difference sensing circuits connected to said input source, each difference sensing circuit being supplied with a different one of said group of relatively coarse reference signals and producing a coarse difference signal indicative of the difference between the input signal and the coarse reference signal supplied thereto;

(d) first selection means connected to the outputs of said difference sensing circuits for selecting one of said coarse difference signals for further transmission;

(e) a second group of parallel connected difference sensing circuits connected to receive said selected coarse difference signal, each difference sensing circuit of said second group being supplied with a different one of a group of said relatively finer reference signals and each producing a fine difference signal indicative of the difference between said selected coarse difference signal and the relatively fine reference signal supplied thereto;

(f) second selection means connected to the outputs of said second group of difference sensing circuits for selecting one of the fine difference signals; and (g) converter means connected to said first and second selection means for converting and combining said selected coarse and fine difference signals into a coded digital output signal.

2. A parallel-parallel encoding system as set forth in claim 1 wherein the first and second selection means include means to select that difference signal having a predetermined sign and the smallest magnitude other than zero.

3. A parallel-parallel encoding system as set forth in claim 2 in which a plurality of groups of difference sensing circuits and a corresponding plurality of selection means are provided and interconnected in tandem such that successive groups of difference sensing circuits are separated by one of said plurality of selection means and wherein the degree of fineness of the reference signals supplied for each of said groups of difference sensing circuits varies as a function of the position of said group relative to the input and wherein the converting means are connected to each of the selection means for converting and combining the outputs thereof into a composite coded digital signal.

4. A parallel-parallel encoding system as set forth in claim 3 wherein the last stage of the system comprises a group of parallel connected comparators connected to receive that difference signal selected by the selection means of the preceding stage, each of said comparators comparing one of a group of said fine reference signals supplied thereto with the selected signals from said preceding stage and producing a comparison output signal indicative of a characteristic of the compared signals, and selection means connected to receive the outputs of said comparators for selecting one of said comparison output signals, and wherein the converting means are connected to the selection means in all stages for converting and combining all the selected signals into a coded digital output signal.

5. A parallel-parallel encoding system as set forth in claim 1 wherein the digital output signals are in a binary code.

6. A parallel-parallel encoding system for converting analogue input signals into coded digital output signals comprising:

(a) an input signal source;

(b) means for generating a group of relatively coarse reference signals and at least one group of relatively fine reference signals;

(c) a group of parallel connected difference sensing circuits connected to said input source, each difference sensing circuit being supplied with a different one of said group of relatively coarse reference signals and producing a coarse difference signal indicative of the difference between the input signal and said coarse reference signal supplied thereto;

(d) first selection means connected to the outputs of said difference sensing circuits for selecting one of said coarse difference signals for further transmission;

(e) a group of parallel connected comparators connected to receive said selected coarse difference signal, each comparator being supplied with a different one of a group of said relatively fine reference signals and producing a comparison output signal indicative of a characteristic of the comparison between said selected coarse difference signal and said relatively fine reference signal supplied thereto;

(f) second selection means connected to the outputs of said group of comparators for selecting one of said comparison signals;

(g) and means connected to the first and second selection means for converting and combining the selected coarse difference signal and the selected comparison signal into a coded digital output signal.

7. A parallel-parallel encoding system as set forth in claim 6 wherein the first and second selection means include means for selecting that signal having a predetermined sign and the smallest magnitude other than zero.

8. A parallel-parallel encoding system as set forth in claim 7 wherein the digital output signals are in a binary code.

References Cited by the Examiner

UNITED STATES PATENTS

| | | | |
|---|---|---|---|
| 3,085,237 | 4/1963 | Bockemuehl | 340—347 |
| 3,167,757 | 1/1965 | O'Aquila | 340—347 |
| 3,216,005 | 11/1965 | Hoffman | 340—347 |

MAYNARD R. WILBUR, *Primary Examiner.*

W. J. ATKINS, *Assistant Examiner.*